Sept. 23, 1958 M. KARL 2,853,627
AUTOMOTIVE SAFETY SWITCH
Filed March 12, 1956
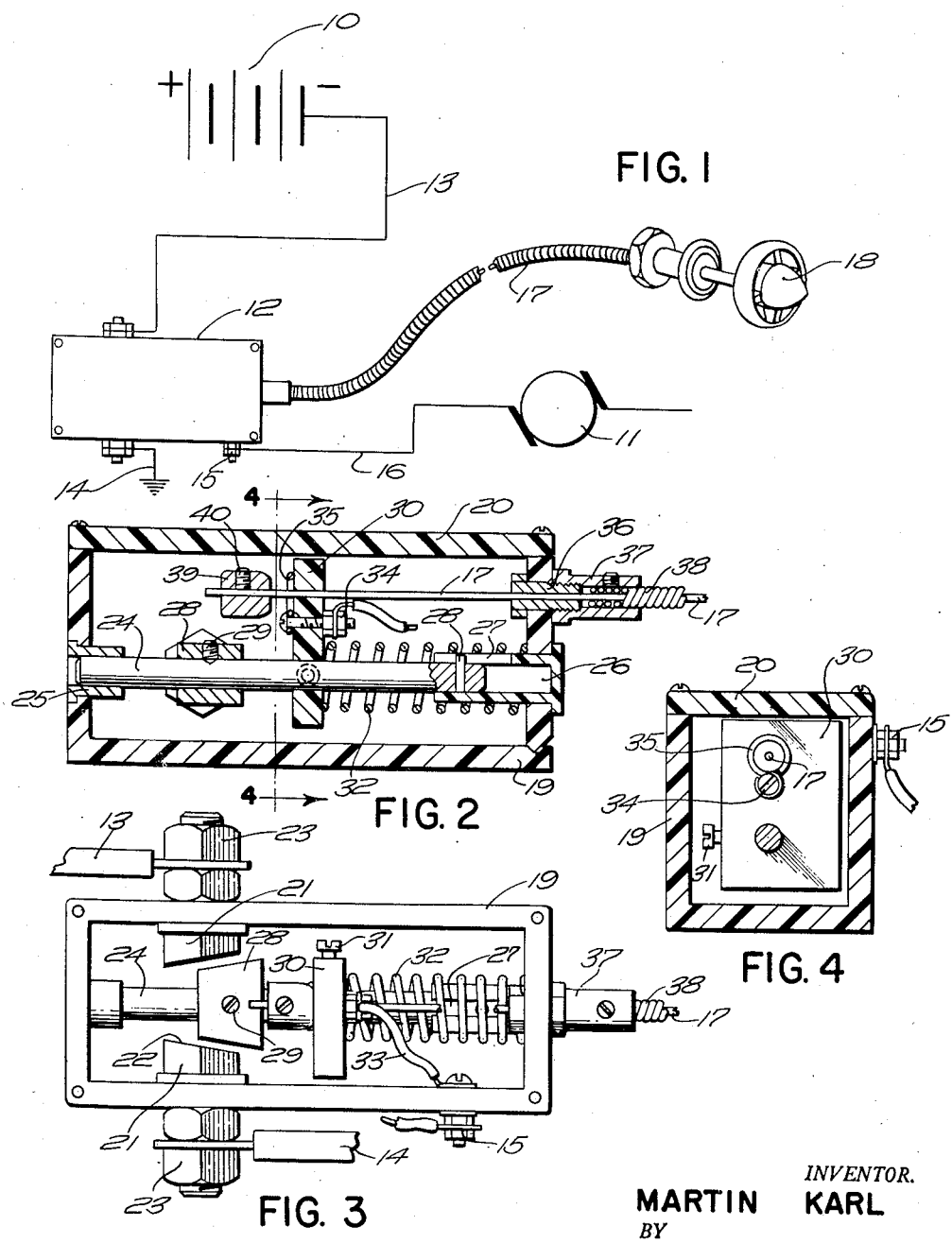
INVENTOR.
MARTIN KARL
BY
Max Schwartz
ATTORNEY

United States Patent Office

2,853,627
Patented Sept. 23, 1958

2,853,627

AUTOMOTIVE SAFETY SWITCH

Martin Karl, Warwick, R. I.

Application March 12, 1956, Serial No. 570,759

4 Claims. (Cl. 307—10)

My present invention relates to automotive vehicles and more particularly to a novel safety switch.

The principal object of the present invention is to provide a safety switch for the electrical systems of automotive vehicles.

Another object of the present invention is to provide a safety switch which will effectively disconnect both the generator and the battery in the electrical system of an automotive vehicle.

A further object of the present invention is to provide a safety switch which is simple in construction and easy to install and operate.

With the above and other objects and advantageous features in view, my invention consists of a novel arrangement of parts more fully disclosed in the detailed description following in conjunction with the accompanying drawings and more particularly defined in the appended claims.

In the drawings:

Fig. 1 is a partially diagrammatic view showing the hookup of the switch of the present invention.

Fig. 2 is a longitudinal section of the switch.

Fig. 3 is a top plan view thereof with the cover removed.

Fig. 4 is a section taken on line 4—4 on Fig. 2.

It has been found that many fires in automotive vehicles are caused by short circuits in the electrical system. In such cases shutting off the motor is not enough to prevent the flow of electrical current. Furthermore, occasionally a small short circuit will slowly drain the battery while the vehicle is standing still and will eventually result in a dead battery. The present invention is designed to provide a simple and effective safety switch for completely cutting off all the electrical current and reducing the fire hazard in an automotive vehicle. I have found that the automotive generator retains a high potential which could cause arcing and burning of an ordinary switch. The safety switch of the present invention therefore provides a means of grounding the generator before opening the circuit.

Referring more in detail to the drawings illustrating my invention, Fig. 1 illustrates the general hookup with the electrical system of an automotive vehicle. The battery 10 and generator 11 are hooked up in the conventional manner not shown. The safety switch 12 is positioned between the battery 10 and its ground connection so that a cable 13 extends from the negative side of the battery to one side of the switch and a cable 14 extends from the other side of the switch to the ground connection. In addition the switch is provided with an auxiliary ground connection 15 from which a cable 16 is hooked into the generator 11. The switch 12 can be operated from the dashboard of the vehicle through a Bowden cable 17 and pull knob 18.

The switch 12 is shown in detail in Figs. 2, 3 and 4. It comprises a rectangular housing 19 having a removable cover 20. The housing 19 is made of Bakelite, wood, plastic, and other non-conducting material. Mounted in each side wall of the housing 19 spaced from the forward end of the housing is a contact post 21 which extends into the housing and has an inner end 22 cut angularly to form a frusto-conical passageway between the two contacts. Each post is provided on the outer end with conventional bolts 23 for attachment to the cable connections 13 and 14.

A shaft 24 is mounted longitudinal of the housing 19 slightly below center so that it extends between the contact posts 21 as shown in Fig. 3. The shaft 24 is mounted for axial sliding movement, the forward end being supported by a hollow bearing 25 and the rear end being supported by an elongated hollow bearing 26 in the front and rear walls of the housing. The rear bearing 26 is provided with a slot 27 in its upper edge and the rear end of the shaft 24 is provided with a vertical pin 28 which rides in the slot to prevent rotation of the shaft.

A frusto-conical block 28 is mounted on the shaft 24 and locked in position by a set screw 29. The block 28 is mounted in such position towards the forward end of the shaft 24 that it will normally be in the passageway between the contact posts 21 and will form a contact between the inclined surfaces 22 of the contact posts as shown in Fig. 2. Midway between the ends of the housing 19 a rectangular dielectric plate 30 is mounted on the shaft 24 and locked thereto by a set screw 31. The plate 30 extends upwardly at right angles from the axis of the shaft. A coil spring 32 surrounds the rear end of the shaft 24 and bearing 26 with one end pressing against the rear wall of the housing and the other end pressing against the plate 30. In this position, seen in Fig. 2, the spring 32 will normally urge the shaft 24 to the left and the block 28 into contacting position with the posts 21.

The generator ground connection 15 comprises a post extending through a side wall of the housing 19 adjacent the rear end. Inside of the housing a short flexible wire connects the post 15 to a post 34 in the plate 30 above the shaft 24. A loop of conductive material 35 is mounted on the post 34 to extend upwardly therefrom in vertical alignment with the shaft 24 as shown in Fig. 4. Mounted in the rear wall of the housing 19, above the bearing 26, is a bearing 36 having a collar 37 adapted to engage the outer wall 38 of the Bowden cable 17. The inner slidable portion of the cable 17 extends horizontally through the bearing 36 and through the plate 30 at a point through the center of the loop of the material 35 as shown in Figs. 2 and 4. A small block 39 is mounted at the end of the cable 17 and locked thereto by a set screw 40 in spaced relation to the plate 30.

In setting up the switch the housing 19 is mounted adjacent the battery 10 with the negative side of the battery connected by the cable 13 to one of the posts 21 as shown in Figs. 1 and 3, and a cable 14 connecting the opposite post 21 to the ground, which is usually the vehicle body. The post 15 is then connected by a wire 16 to the generator 11. The Bowden cable 17 is clamped to the body of the vehicle in the conventional manner with the knob 18 extending through the dashboard. It should be noted that the cable 17 also forms a ground connection. When it is desired to disconnect or cut off the electrical system of the vehicle the knob 18 is pulled outwardly. Initial movement of the cable 17 will cause the block 39 to contact the ring 35 and connect the generator 11 to the ground, thus discharging the generator. Further movement of the cable 17 will cause the block 39 to pull the plate 30 rearwardly against the action of the spring 32. This will cause the shaft 24 to slide rearwardly into the position shown in Fig. 3 so that the block 28 is moved back from between the contact posts 21 breaking the battery ground connection. Any short circuits in the electrical system will be rendered harmless since the car and battery are no longer grounded to each other. When the knob 18 is pushed inwardly the spring 32 will push the shaft 24 to the left and cause the block 28 to again close the ground connection and then further movement of the cable 17 will move the block 39 away from the loop 35 and allow the generator to cut in. If a mechanic is working on the car he may wish to disconnect the generator without cutting off the battery and a small movement of the cable 17 will accomplish this result. In any event the electrical mechanism can readily be disconnected or connected during the work without touching the various cable connections.

In use the switch may be used as a safety measure when the vehicle is left unattended or garaged over night. Fires due to short circuits will be completely eliminated as will also run down batteries due to leaking circuits. In the event of a fire while the vehicle is in motion, cutting the engine will not eliminate the sparking due to a short circuit. The switch of the present invention will accomplish this result. By grounding the generator before cutting off the battery the load potential across the contact posts 21 is reduced so that there is no arcing or burning. Other advantages of the present invention will be readily apparent to a person skilled in the art.

I claim:

1. A switch for the electrical system of an automotive vehicle comprising a rectangular dielectric housing, a pair of axially aligned contact elements extending into said housing from opposite side walls, one of said elements being connected to the negative post of the vehicle battery, the other element being connected to the vehicle ground, contact means mounted in said housing for movement into and out of contact with said elements, said contact means including a shaft axially slidably mounted in said housing and a block mounted on said shaft for contacting said elements, said elements having tapered ends and said block having tapered sides, an auxiliary ground connection in said housing connected to the vehicle generator, and means for making and breaking said generator ground connection on movement of said contact means, said generator ground connection being made before the breaking of said battery contact when said contact means is moved out of contact with said contact elements, and said generator ground connection being broken after the making of said battery contact when said contact member is moved into contact with said contact elements.

2. A switch for the electrical system of an automotive vehicle comprising a rectangular dielectric housing, a pair of axially aligned contact elements extending into said housing from opposite side walls, one of said elements being connected to the negative post of the vehicle battery, the other element being connected to the vehicle ground, contact means mounted in said housing for movement into and out of contact with said elements, said contact means including a shaft axially slidably mounted in said housing and a block mounted on said shaft for contacting said elements, an auxiliary ground connection in said housing connected to the vehicle generator, and means for making and breaking said generator ground connection on movement of said contact means, comprising a dielectric plate mounted on said shaft, a cord connection from said plate to said generator connection, a grounded Bowden cable extending through said housing rear wall and through said plate, and means on said cable for contacting said generator cord connection on movement of said cable, said generator ground connection being made before the breaking of said battery contact when said contact means is moved out of contact with said contact elements, and said generator ground connection being broken after the making of said battery contact when said contact member is moved into contact with said contact elements.

3. A switch for the electrical system of an automotive vehicle comprising a rectangular dielectric housing, a pair of axially aligned contact elements extending into said housing from opposite side walls, one of said elements being connected to the negative post of the vehicle battery, the other element being connected to the vehicle ground, contact means mounted in said housing for movement into and out of contact with said elements, said contact means including a shaft axially slidably mounted in said housing and a bock mounted on said shaft for contacting said elements, said elements having tapered ends and said block having tapered sides, an auxiliary ground connection in said housing connected to the vehicle generator, and means for making and breaking said generator ground connection on movement of said contact means, comprising a dielectric plate mounted on said shaft, a cord connection from said plate to said generator connection, a grounded Bowden cable extending through said housing rear wall and through said plate, and means on said cable for contacting said generator cord connection on movement of said cable, said generator ground connection being made before the breaking of said battery contact when said contact means is moved out of contact with said contact elements, and said generator ground connection being broken after the making of said battery contact when said contact member is moved into contact with said contact elements.

4. A switch for the electrical system of an automotive vehicle comprising a rectangular dielectric housing, a pair of axially aligned contact elements extending into said housing from opposite side walls, one of said elements being connected to the negative post of the vehicle battery, the other element being connected to the vehicle ground, contact means mounted in said housing for movement into and out of contact with said elements, said contact means including a shaft axially slidably mounted in said housing and a block mounted on said shaft for contacting said elements, said resilient means comprising a coil spring surrounding said shaft, an auxiliary ground connection in said housing connected to the vehicle generator, and means for making and breaking said generator ground connection on movement of said contact means, comprising a dielectric plate mounted on said shaft, a cord connection from said plate to said generator connection, a grounded Bowden cable extending through said housing rear wall and through said plate, and means on said cable for contacting said generator cord connection on movement of said cable, said coil spring extending between said plate and the rear wall of said housing, said generator ground connection being made before the breaking of said battery contact when said contact means is moved out of contact with said contact elements, and said generator ground connection being broken after the making of said battery contact when said contact member is moved into contact with said contact elements.

References Cited in the file of this patent

UNITED STATES PATENTS

| | | |
|---|---|---|
| 2,523,215 | Irvine | Sept. 19, 1950 |
| 2,538,581 | Minch et al. | Jan. 16, 1951 |
| 2,639,391 | Stone | May 19, 1953 |